US010627484B2

(12) United States Patent
Miyazaki

(10) Patent No.: US 10,627,484 B2
(45) Date of Patent: Apr. 21, 2020

(54) RADAR APPARATUS

(71) Applicant: DENSO TEN Limited, Kobe-shi, Hyogo (JP)

(72) Inventor: Toshiyuki Miyazaki, Kobe (JP)

(73) Assignee: DENSO TEN Limited, Kobe (JP)

( * ) Notice: Subject to any disclaimer, the term of this patent is extended or adjusted under 35 U.S.C. 154(b) by 278 days.

(21) Appl. No.: 15/826,915

(22) Filed: Nov. 30, 2017

(65) Prior Publication Data

US 2018/0217232 A1    Aug. 2, 2018

(30) Foreign Application Priority Data

Feb. 2, 2017    (JP) .................................. 2017-017804

(51) Int. Cl.
| | | |
|---|---|---|
| *G01S 7/41* | (2006.01) | |
| *G01S 13/58* | (2006.01) | |
| *G01S 13/72* | (2006.01) | |
| *G01S 13/931* | (2020.01) | |
| *G01S 13/42* | (2006.01) | |

(52) U.S. Cl.
CPC .............. *G01S 7/415* (2013.01); *G01S 13/42* (2013.01); *G01S 13/584* (2013.01); *G01S 13/72* (2013.01); *G01S 13/726* (2013.01); *G01S 13/931* (2013.01)

(58) Field of Classification Search
CPC ........ G01S 13/42; G01S 13/584; G01S 13/72; G01S 13/726; G01S 13/931; G01S 7/415
USPC ........................................................ 342/107
See application file for complete search history.

(56) References Cited

U.S. PATENT DOCUMENTS

| | | | |
|---|---|---|---|
| 2011/0295549 A1* | 12/2011 | Takabayashi ......... | G01S 7/4004 702/142 |
| 2016/0209211 A1* | 7/2016 | Song ...................... | G01B 21/24 |
| 2018/0211536 A1* | 7/2018 | Akamine ............... | G08G 1/166 |

FOREIGN PATENT DOCUMENTS

| | | |
|---|---|---|
| JP | 2008-051615 A | 3/2008 |
| JP | 2010-038706 A | 2/2010 |

* cited by examiner

*Primary Examiner* — Timothy X Pham
(74) *Attorney, Agent, or Firm* — Oliff PLC

(57) ABSTRACT

A radar apparatus includes; a detection unit that performs a detection processing of detecting a target iteratively at a predetermined cycle; a speed deriving unit that derives a speed of the target detected in a current iteration of the detection processing; a region setting unit that sets a prediction region where the target having temporal continuity with and being identical to the target detected in the current iteration of the detection processing is expected to be detected in a next iteration of the detection processing, while changing at least one of a size and a shape of the prediction region according to the speed derived by the speed deriving unit; and a determination unit that determines whether the target detected in the next iteration of the detection processing in the prediction region set by the region setting unit has the temporal continuity with and is identical to the target detected in the current iteration of the detection processing.

12 Claims, 14 Drawing Sheets

RADAR APPARATUS

BACKGROUND OF THE INVENTION

Field of the Invention

The present invention relates to a target detection technology for a radar apparatus.

Background Art

In the related art, a radar apparatus continuously tracks the detected target by performing detection processing for detecting a target at a predetermined cycle. Such a radar apparatus sets a prediction region where the target detected in current detection processing is detected in a next iteration of the detection processing, and determines that the target detected in the prediction region in the next iteration of the detection processing is the same as the target detected in the current iteration of the detection processing.

However, in the radar apparatus in the related art, in some cases, the tracking of the target may fail in the tracking method in the related art.

SUMMARY OF THE INVENTION

According to an aspect of the invention, there is provided a radar apparatus that includes; a detection unit that performs a detection processing of detecting a target iteratively at a predetermined cycle; a speed deriving unit that derives a speed of the target detected in a current iteration of the detection processing; a region setting unit that sets a prediction region where the target having temporal continuity with and being identical to the target detected in the current iteration of the detection processing is expected to be detected in a next iteration of the detection processing, while changing at least one of a size and a shape of the prediction region according to the speed derived by the speed deriving unit; and a determination unit that determines whether the target detected in the next iteration of the detection processing in the prediction region set by the region setting unit has the temporal continuity with and is identical to the target detected in the current iteration of the detection processing.

As a result, the radar apparatus can reduce a target tracking failure probability. In addition, according to another aspect of the invention, in a case where a new target is detected in the current detection processing and the speed of the new target is lower than a threshold value, the region setting unit sets an inside of a predetermined region having a center at a detection position of the new target as the prediction region, and in a case where the speed of the new target is equal to or higher than the threshold value, sets the prediction region at an outside of the predetermined region.

As a result, the radar apparatus can prevent a target existing outside of the prediction region from being erroneously determined as a pedestrian, from the position where the pedestrian is newly detected until the next processing is performed.

Therefore, an object of the invention is to reduce the target tracking failure probability.

These and other objects, features, aspects and advantages of the present invention will become more apparent from the following detailed description of the present invention when taken in conjunction with the accompanying drawings.

DETAILED DESCRIPTION OF THE INVENTION

Figure 1:
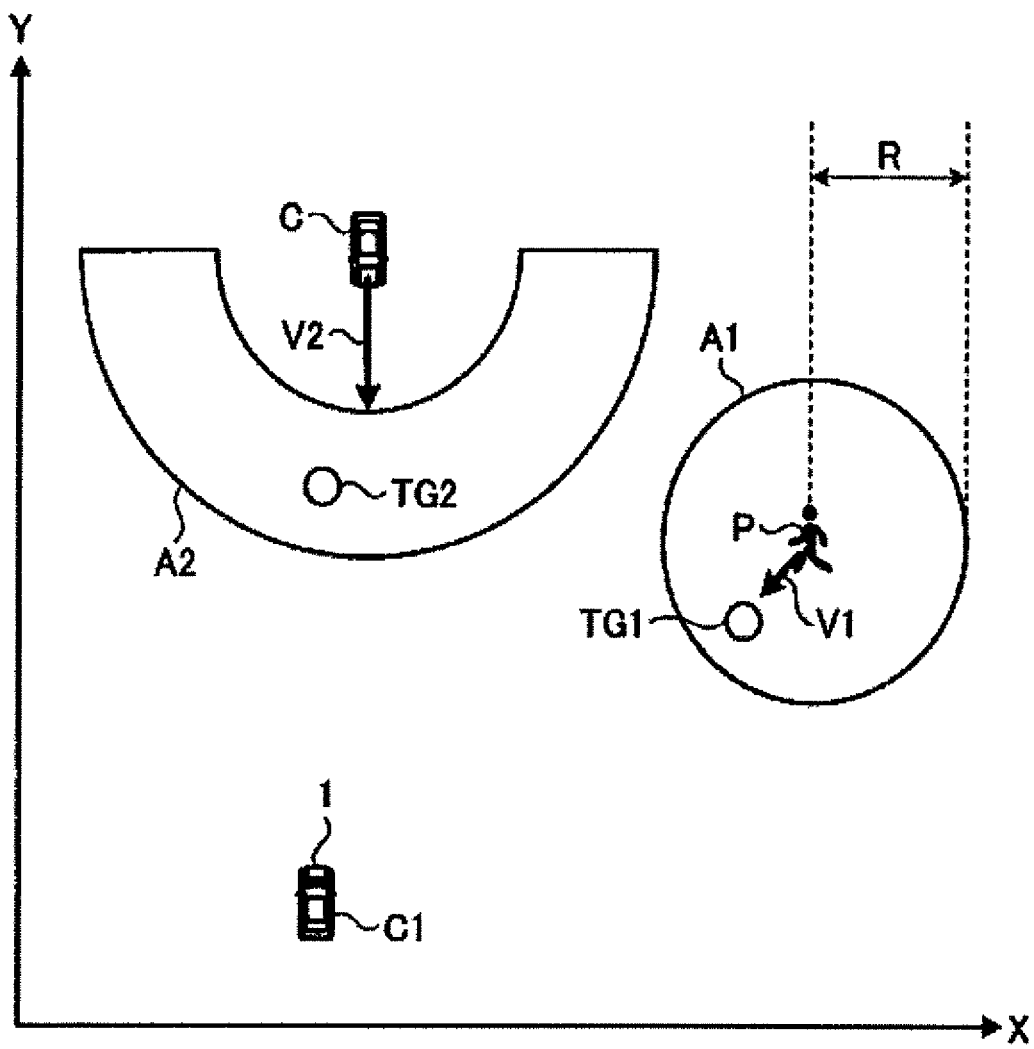
FIG. 1 is an explanatory diagram of a target detection method in an embodiment.

Hereinafter, embodiments of the radar apparatus and a target detection method disclosed in the present application will be described in detail with reference to the accompanying drawings. The invention is not limited to the embodiments described below. First, the target detection method according to the embodiment will be described with reference to FIG. 1. FIG. 1 is an explanatory diagram of a target detection method in the embodiment.

Here, the description will be made for a case where a radar apparatus 1 in the embodiment is provided at the center of the front grille of a host vehicle C1, and a target existing in front of or at the side of the host vehicle C1 is detected. In a case where the radar apparatus 1 is provided at the back of the host vehicle C1, the radar apparatus 1 can also detect the target existing behind the host vehicle C1.

As the target existing in front of or at the side of the host vehicle C1, there are, for example, a preceding vehicle, an oncoming vehicle, a bicycle, road side objects such as signs, and a pedestrian having a possibility to collide with the host vehicle C1 (hereinafter, simply referred to as "pedestrian P").

In addition here, as illustrated in FIG. 1, the description will be made for a case where the host vehicle C1 including the radar apparatus 1, an oncoming vehicle C traveling in an oncoming lane on a road on which the host vehicle C1 travels, and the pedestrian P approaching from the front right side to the host vehicle C1 exist in an XY orthogonal coordinate system defined on the ground surface.

The radar apparatus 1 performs a detection processing of detecting the target existing in the periphery iteratively at a predetermined cycle. Hereinafter, for the convenience, in some cases, current detection processing will be referred to as current processing, a next iteration of the detection processing will be referred to as next processing, and previous detection processing may be referred to as previous processing.

In a case where a target is detected in the current processing, the radar apparatus 1 sets a prediction region where a target same as the detected target is detected in the next processing, and continues to track the target by searching the prediction region in the next processing and detecting a target same as the target detected in the current processing.

Here, in a case where a new target is detected, a general radar apparatus sets a predetermined range with a center at the position of the detected target as a prediction region, and then, sequentially sets the prediction region with a center at the predicted position of the next target which is predicted based on the position of the target detected in the prediction region.

At this time, the general radar apparatus sets a prediction region of the same size every time. Therefore, in a case where not only the target same as the target detected in the previous processing but also another target is included in the prediction region, the general radar apparatus may erroneously determine such another target as a target same as the target detected in the previous processing, and fail to track the target.

Therefore, as will be described below with reference to FIG. 1, by deriving a speed of the target detected in the current processing and setting at least one of a size and a shape of the prediction region according to the speed of the target, the radar apparatus in the embodiment reduces the target tracking failure probability.

Specifically, as illustrated in FIG. 1, for example, in a case where a target (here, assumed to be a pedestrian P) having a lower moving speed (hereinafter, simply referred to as a "speed") compared to a target moving at a high speed such as the oncoming vehicle C is newly detected, first, the radar apparatus 1 derives a speed V1 of the pedestrian P.

In a case where the derived speed V1 is lower than a predetermined threshold value (for example, 8 km/h), the radar apparatus 1 determines that the pedestrian P is a low-speed moving target and sets a circular prediction region A1 having a center at the position of the newly detected pedestrian P. Hereinafter, this prediction region A1 will be described as a region having a predetermined size, however, the radar apparatus 1 may change the size of the prediction region A1 according to the speed of the target such as the pedestrian P. For example, in a case where the speed of the target becomes high, the size of the prediction region A1 may be increased, and in a case where the speed of the target becomes low, the size of the prediction region A1 may be decreased.

The radar apparatus 1 sets a circular prediction region A1 of which the radius is a distance that the pedestrian P can move from the center on foot or on a half-running having a center at the position of pedestrian P newly detected in the current processing during a period from the current processing to the next processing (during a cycle of the detection processing).

The radar apparatus 1 determines that a pedestrian TG1 detected in the prediction region A1 in the next processing is the same target having the temporal continuity with the pedestrian P detected in the current processing (hereinafter, sometimes simply referred to as "the same target").

In this way, the radar apparatus 1 can prevent the position not to reach on foot or on half-running, that is, the target existing outside the prediction region A1 from being erroneously determined as the pedestrian P from the position where the pedestrian P is newly detected until the next processing is performed. Therefore, in a case where the low-speed moving target is detected, the radar apparatus 1 can reduce the target tracking failure probability.

Moreover, in a case where the detected target is the pedestrian P, since the circular prediction region A1 having a center at the detection position is set, even if the pedestrian P takes an action hard to predict such as suddenly changing his/her moving direction, the radar apparatus 1 can detect the pedestrian P in the prediction region A1 in the next processing.

In addition, for example, in a case where a new target (here, it is assumed to be an oncoming vehicle C) having a speed higher than that of the low-speed moving target such as the pedestrian P is newly detected, the radar apparatus 1 derives the speed V2 of the oncoming vehicle C. Subsequently, in a case where the derived speed V2 is equal to or higher than a predetermined threshold value, the radar apparatus 1 determines the oncoming vehicle C as a high-speed moving target.

Here, since the oncoming vehicle C moves faster than the pedestrian P, in a case where the next processing is performed, the possibility of being in a range relatively close to a newly detected position is low. In addition, the oncoming vehicle C is unlikely to take an action hard to predict such as suddenly changing its moving direction such as the pedestrian P.

Therefore, the radar apparatus 1 excludes a circular region having a center at the position where the oncoming vehicle C was newly detected from the prediction region, and sets a half donut-shaped prediction region A2 positioned on the speed direction side of the oncoming vehicle C among the regions annularly surrounding the excluded circular region as the prediction region. Then, the radar apparatus 1 determines that the oncoming vehicle TG2 detected in the prediction region A2 in the next processing is the target same as the oncoming vehicle C detected in the current processing.

In this way, the radar apparatus 1 can prevent another target existing at a position not to be detected in the next processing if that is a high-speed moving target and too close to the newly detected position of the oncoming vehicle C from being erroneously determined as the oncoming vehicle C.

In addition, the radar apparatus 1 can prevent a target existing in the rear region of the oncoming vehicle C not to be detected in the next processing from being erroneously determined as the oncoming vehicle C unless an impossible situation occurs such as oncoming vehicle C suddenly retreats.

Therefore, according to the radar apparatus 1, it is possible to reduce the target tracking failure probability even in a case where a high-speed moving target is detected. The prediction region setting procedure in a case where the radar apparatus 1 consecutively performs the detection processing equal to or more than two times will be described later with reference to FIG. 5B and FIG. 6C.

Figure 2:
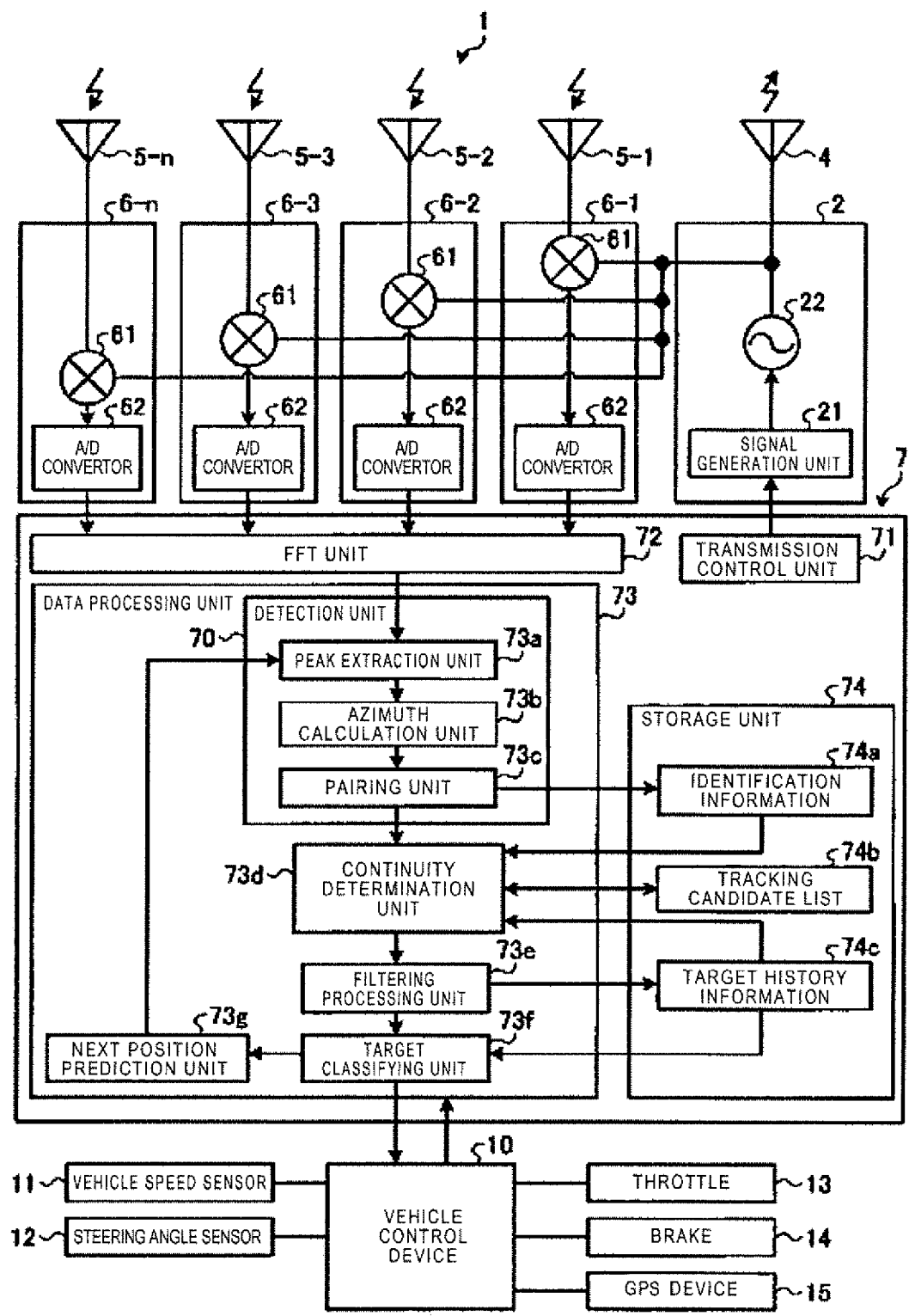
FIG. 2 is a block diagram illustrating a radar apparatus in the embodiment.

Next, the configuration of the radar apparatus 1 in the embodiment will be described with reference to FIG. 2. FIG. 2 is a block diagram illustrating the radar apparatus 1 in the embodiment. In FIG. 2, only the configuration elements necessary for explaining the features of the present embodiment are represented by functional blocks, and descriptions for general configuration elements are omitted.

In other words, the configuration elements illustrated in FIG. 2 are functionally conceptual, and do not necessarily have to be physically configured as illustrated. For example, the specific form of the distribution and integration of each functional block is not limited to those illustrated in the drawing, and all or a part thereof can be configured in functionally or physically distributed or integrated in arbitrary units depending on various loads and usage situations.

As illustrated in FIG. 2, the radar apparatus 1 includes a transmission unit 2 and a transmission antenna 4 as configuration elements for configuring a transmission system. The transmission unit 2 includes a signal generation unit 21 and an oscillator 22.

In addition, the radar apparatus 1 includes reception antennae 5-1 to 5-$n$ and reception units 6-1 to 6-$n$ as configuration elements for configuring a reception system. Each of the reception units 6-1 to 6-$n$ includes a mixer 61 and an A/D convertor 62. In addition, the radar apparatus 1 includes a signal processing device 7 as a configuration element for configuring a signal processing system.

Hereinafter, for the simplicity of explanation, in a case of being simply described as a "reception antenna 5", it is assumed to mean that the reception antennae 5-1 to 5-$n$ are collectively referred to. This point also applies to a "reception unit 6".

The transmission unit 2 performs processing for generating a transmission signal. The signal generation unit 21 generates a modulation signal for transmitting a millimeter wave which is frequency-modulated to a triangular wave under the control of a transmission control unit 71 included in the signal processing device 7 to be described later. The oscillator 22 generates a transmission signal based on the modulation signal generated by the signal generation unit 21.

The transmission antenna 4 transmits the transmission signal generated by the oscillator 22 as a transmission wave toward the front of the host vehicle C1. As illustrated in FIG. 2, the transmission signal generated by the oscillator 22 is also distributed to the mixers 61 described later.

In the reception antenna 5, the transmission wave transmitted from the transmission antenna 4 is reflected at the target, and the reflected wave coming from the target is received as a reception signal. Each of the reception units 6 performs pre-stage processing until each of the received reception signals is transferred to the signal processing device 7.

Specifically, each of the mixers 61 mixes the transmission signal distributed as described above and the reception signal received in each of the reception antennae 5, and then, generates a beat signal. A corresponding amplifier may be arranged between the reception antenna 5 and the mixer 61.

The A/D convertor 62 converts the beat signal generated by the mixer 61 to a digital signal, and outputs the digital signal to the signal processing device 7. The signal processing device 7 includes the transmission control unit 71, a fast Fourier transform (FFT) unit 72, a data processing unit 73, and a storage unit 74.

The data processing unit 73 includes, for example, a microcomputer including a central processing unit (CPU), a read only memory (ROM), a random access memory (RAM), and an input/output port, and various circuits. The data processing unit 73 includes a plurality of processing units which function by executing a target detection program stored in the ROM by the CPU using the RAM as a work area. Specifically, the data processing unit 73 includes a detection unit 70, a continuity determination unit 73$d$, a filtering processing unit 73$e$, a target classifying unit 73$f$, and a next position prediction unit 73$g$. The detection unit 70 includes a peak extraction unit 73$a$, an azimuth calculation unit 73$b$, and a pairing unit 73$c$.

Each processing unit included in the data processing unit 73 may be partially or wholly configured as hardware such as an application specific integrated circuit (ASIC) or a field programmable gate array (FPGA).

The storage unit 74 is a memory device such as a hard disk drive, a nonvolatile memory, and a register, and stores identification information 74$a$, a tracking candidate list 74$b$, and target history information 74$c$. The identification information 74$a$ is information in which each target detected by the detection unit 70 is associated with a type of each target. The types of the target here include vehicles, bicycles, pedestrians, and road side objects.

The tracking candidate list 74$b$ is a list in which information relating to the target that may possibly be a target same as the target detected in the previous processing among a plurality of targets detected in the current processing is registered. In the tracking candidate list 74$b$, information relating to all the targets detected in current processing is temporarily registered.

Thereafter, the information relating to the target determined not to be the target same as the target detected in the previous processing is sequentially deleted from the tracking candidate list 74$b$ by the below-described continuity determination processing performed by the continuity determination unit 73$d$. The target history information 74$c$ is information indicating the history of the positions and the like of the target sequentially detected in chronological order for one target.

The transmission control unit 71 controls the transmission unit 2 that includes the signal generation unit 21 described above. In addition, although not illustrated, the transmission control unit 71 also performs control of each reception unit 6. The FFT unit 72 performs fast Fourier transform on the beat signal input from each A/D convertor 62, and outputs the result to the peak extraction unit 73$a$ of the data processing unit 73.

The detection unit 70 is a processing unit that performs a detection processing of detecting the target based on the result of the fast Fourier transform input from the FFT unit 72 at a predetermined cycle (for example, 50 ms cycle) and outputs the information relating to the detected target to the continuity determination unit 73$d$.

As described above, the detection unit 70 includes the peak extraction unit 73$a$, the azimuth calculation unit 73$b$, and the pairing unit 73$c$. The peak extraction unit 73$a$ is a processing unit that performs peak extraction processing for extracting a peak frequency which is a peak in the result of the fast Fourier transform by the FFT unit 72, and outputs the result of the peak extraction processing to the azimuth calculation unit 73$b$.

The peak extraction unit 73$a$ extracts the peak frequencies at each of an UP section of the beat signal and a DOWN section (hereinafter referred to as "DN") based on the result of the fast Fourier transform. At this time, the peak extraction unit 73$a$ performs stationary object peak extraction processing and history peak extraction processing.

The stationary object peak extraction processing is processing for extracting the peak signal of each section in which a difference of the peak frequency between the UP section and the DN section corresponds to the speed of the host vehicle C1 as the peak frequency corresponding to the stationary object. In addition, the history peak extraction processing is processing for extracting the peak frequencies of UP and DN sections having temporal continuity with the target detected in the past detection processing, from the extracted peak frequencies.

The peak extraction unit 73a acquires the information including the peak frequency (hereinafter, referred to as "predicted peak frequency") derived by the next position prediction unit 73g based on the position and the relative speed of the target. The peak extraction unit 73a performs the history peak extraction processing by extracting the peak frequency in the vicinity of the predicted peak frequency.

Then, the peak extraction unit 73a outputs the result of the stationary object peak extraction processing and the result of the history peak extraction processing to the azimuth calculation unit 73b. At this time, the peak extraction unit 73a outputs the peak frequencies in the UP section and DN section in the vicinity of the predicted peak frequency to the azimuth calculation unit 73b as the result of history peak extraction processing.

The azimuth calculation unit 73b calculates an arrival angle and signal intensity (reception level) of the reflected wave corresponding to each of the peak frequencies extracted by the peak extraction unit 73a. The azimuth calculation unit 73b performs an azimuth calculation of the arrival angle of the reflected wave using a predetermined arrival direction estimation method such as an estimation of signal parameters via rotational invariance techniques (ES-PRIT).

At this time point, since the arrival angle is an angle in which the target is estimated to exist, hereinafter, the arrival angle will be referred to as an "estimated angle". In addition, the azimuth calculation unit 73b outputs the calculated estimated angle and the reception level to the pairing unit 73e.

The pairing unit 73c determines a correct combination of the peak frequencies for each of the UP section and the DN section based on the result of calculation by the azimuth calculation unit 73b and pairs the frequencies, and then, calculates the distance and the relative speed of each target using the result of pairing.

At this time, the pairing unit 73c performs history pairing for pairing the peak frequencies of the UP section and the DN section extracted by the peak extraction unit 73a based on the predicted peak frequency, and then, calculates the distance and the relative speed of the target.

Then, the pairing unit 73c outputs information relating to each target including the estimated angle, the distance and the relative speed of each target (hereinafter, sometimes referred to as "target information") to the continuity determination unit 73d as the result of detecting the target.

In addition, the pairing unit 73c identifies the type of the detected target, generates identification information 74a in which the identified type is associated with the target, and stores the information in the storage unit 74. At this time, the pairing unit 73e identifies the type of each target using, for example, a support vector machine (SVM) or deep learning based on feature data such as the peak frequency and a power of the peak signal to be paired.

The continuity determination unit 73d is a processing unit that performs continuity determination processing for determining whether or not the target detected in the current processing is a target having temporal continuity with and same as the target detected in the previous processing. The continuity determination unit 73d temporarily registers the target information of all the targets detected in the current processing input from the pairing unit 73c in the tracking candidate list 74b.

In addition, the continuity determination unit 73d sets prediction regions (for example, the prediction regions A1, A2 and the like in FIG. 1) where the target detected in the current processing is detected again in the next processing, for each detection processing based on the information acquired from the target history information 74c and a vehicle control device 10 described later.

Then, the continuity determination unit 73d performs the continuity determination processing based on the prediction region set in the previous processing and the identification information 74a of each target stored in the storage unit 74. At this time, the continuity determination unit 73d performs the continuity determination processing by determining whether or not each target registered in the tracking candidate list 74b is the target in the prediction region set in the previous processing, and whether or not each target is the target having the type same as the target detected in the previous processing.

As a result of the continuity determination processing, the continuity determination unit 73d sequentially deletes the target information of the target which is determined not to be the target having the temporal continuity with and same as the target detected in the previous processing from the tracking candidate list 74b. As a result thereof, the continuity determination unit 73d finally determines that the target of which the target information remains in the tracking candidate list 74b is the target having the temporal continuity with and same as the target detected in the previous processing.

Then, the continuity determination unit 73d performs predetermined smoothing processing on the target information of the target determined to be the same target, and outputs the target information after the smoothing processing to the filtering processing unit 73e as a result of the continuity determination processing. An example of the configuration and operation of the continuity determination unit 73d will be described in detail with reference to FIG. 3 to FIG. 6C.

The filtering processing unit 73e is a processing unit that suppresses variations of instantaneous values by filtering processing for averaging a plurality of instantaneous values processed in chronological order for each target, and determines the position and the like of the target detected in the current iteration of the detection processing.

In a case where the target which is subject to the filtering processing is a low-speed moving target such as a pedestrian, the filtering processing unit 73e performs the filtering processing using a Kalman filter having a relatively low processing load. In addition, in a case where the target which is subject to the filtering processing is a high-speed moving target such as an oncoming vehicle C, the filtering processing unit 73e performs the filtering processing using a particle filter having a high followability to the speed. As described above, the filtering processing unit 73e can change the filtering processing method according to the type of the target.

The filtering processing unit 73e stores the information relating to the target after the filtering processing as the target history information 74c in the storage unit 74, and outputs the information relating to the target after the filtering processing to the target classifying unit 73f. Here, the information relating to the target includes, for example, the position, the estimated angle, the distance, the relative speed, and the like of each target after the filtering processing.

The target classifying unit 73f classifies each target into a moving object (for example, a preceding vehicle, an oncoming vehicle, a bicycle, a pedestrian, and the like) and a stationary object based on the result of the filtering processing by the filtering processing unit 73e and the target history information 74c. The target classifying unit 73f outputs the target information of the target classified as a moving object and the target history information 74c relating to the target to the next position prediction unit 73g.

The next position prediction unit 73g predicts the predicted position where the target detected in the current processing is detected again in the next processing based on the target information input from the target classifying unit 73f and the target history information 74c, and outputs the information including the predicted position to the peak extraction unit 73a.

The next position prediction unit 73g derives a moving distance, the direction, and the relative speed of the target during the period from the previous processing to the current processing based on, for example, the position and the relative speed of the target detected in the previous processing and the position and the relative speed of the target detected in the current processing. Subsequently, the next position prediction unit 73g predicts the position and the relative speed at which the target is detected in the next processing, using the derived moving distance, the moving direction, and the relative speed of the target.

The next position prediction unit 73g derives the peak frequency (predicted peak frequency) in the UP section and the DN sections based on the predicted position and the relative speed, and outputs the peak frequency to the peak extraction unit 73a.

In addition, the target classifying unit 73f outputs the target information (including an actual angle, the distance, the relative speed, and the like) relating to each target together with the classified result of classification to the external device. Here, the external device is, for example, the vehicle control device 10.

The vehicle control device 10 is an electronic control unit (ECU) that controls each device of the host vehicle C1. The vehicle control device 10 is electrically connected to, for example, a vehicle speed sensor 11, a steering angle sensor 12, a throttle 13, and a brake 14. In addition, the vehicle control device 10 is also connected to a global positioning system (GPS) device 15.

The vehicle control device 10 performs vehicle control such as an adaptive cruise control (ACC) and a pre-crash safety system (PCS) based on the target information acquired from the radar apparatus 1.

For example, in a case of performing the ACC, the vehicle control device 10 keeps a constant distance between the host vehicle and the preceding vehicle using the target information acquired from radar apparatus 1, and controls the throttle 13 and the brake 14 such that the host vehicle C1 follows the preceding vehicle. In addition, the vehicle control device 10 acquires the occasionally changing traveling condition of the host vehicle C1 such as the vehicle speed, the steering angle, and the like from the vehicle speed sensor 11, the steering angle sensor 12, and the like every time and feeds the situation information back to the radar apparatus 1.

In addition, in a case of performing the PCS, when it is detected that there exists a preceding vehicle, a stationary object, or the like having a risk of collision in the traveling direction of the host vehicle C1, the vehicle control device 10 controls the brake 14 and decelerates the host vehicle C1 using the target information acquired from the radar apparatus 1. In addition, for example, warning is given to the passenger of the host vehicle C1 using a (not illustrated) warning device, or the seat belt in the passenger compartment is pulled in to fix the passenger to the seat.

Figure 3:
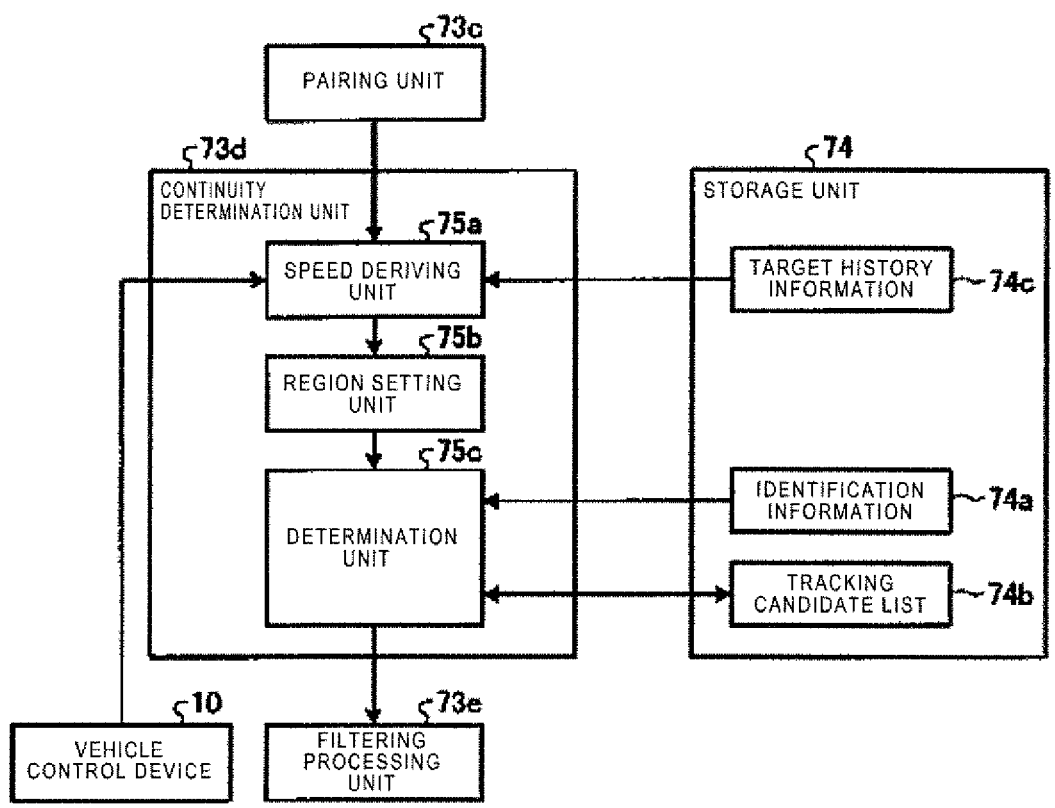
FIG. 3 is an explanatory diagram illustrating an example of a configuration of a continuity determination unit in the embodiment.

Next, an example of the configuration of the continuity determination unit 73d in the embodiment will be described with reference to FIG. 3. FIG. 3 is an explanatory diagram illustrating an example of the configuration of the continuity determination unit 73d in the embodiment. The determination unit 75c is a processing unit that determines whether or not the target detected in the current processing is the target having the temporal continuity with and same as the target detected in the previous processing. As illustrated in FIG. 3, the continuity determination unit 73d includes a speed deriving unit 75a, a region setting unit 75b, and a determination unit 75c.

The speed deriving unit 75a is a processing unit that derives a speed of the target for which the target information is input from the pairing unit 73c, and outputs the information indicating the derived speed and the target information of the target to the region setting unit 75b.

The speed deriving unit 75a derives the speed of each target based on the speed of the host vehicle C1 acquired from the vehicle speed sensor 11 via the vehicle control device 10, a current position of the host vehicle C1 acquired from the GPS device 15, and the target history information 74c acquired from the storage unit 74.

Figure 4A:
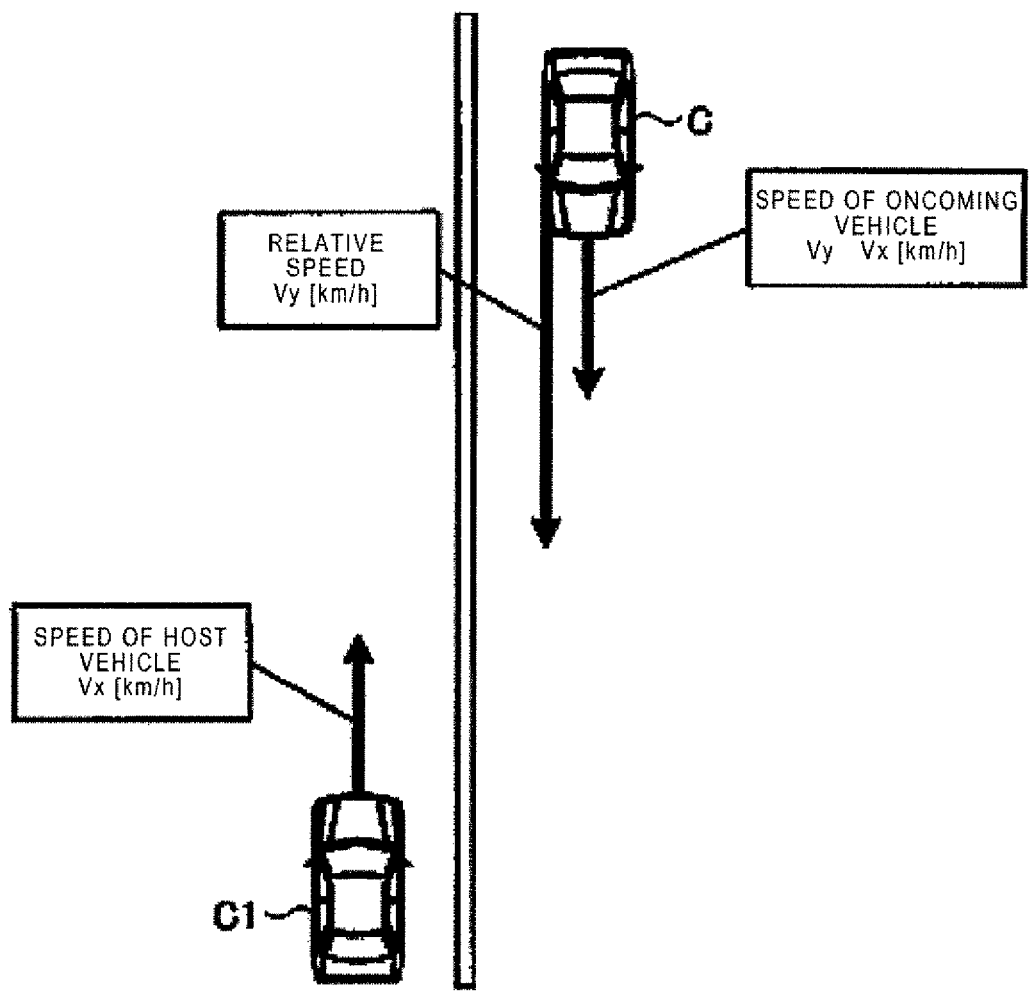
FIG. 4A is an explanatory diagram of a speed deriving procedure by a speed deriving unit in the embodiment.
Figure 4B:
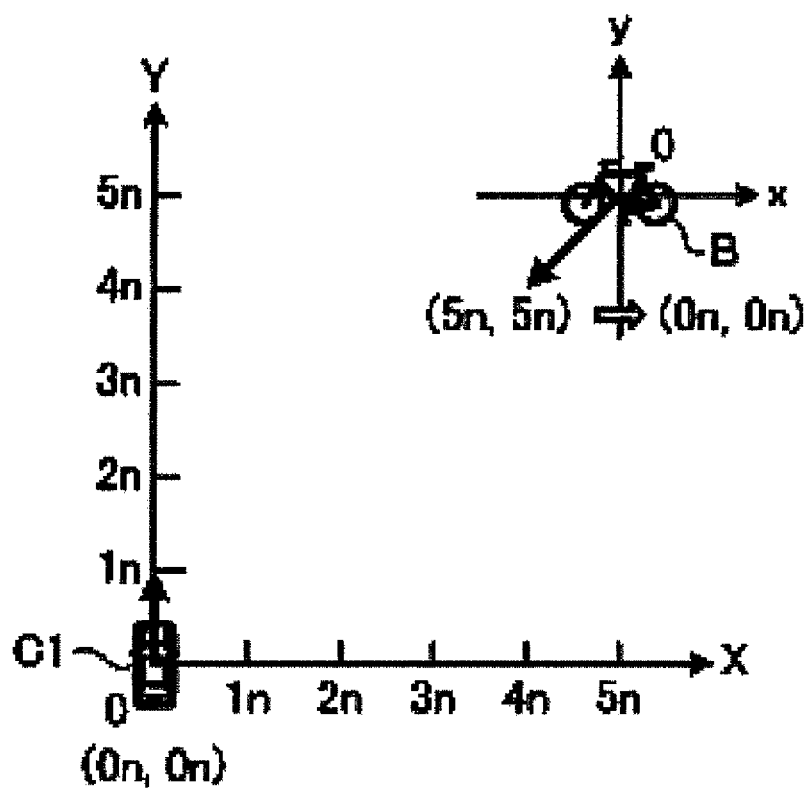
FIG. 4B is an explanatory diagram of the speed deriving procedure by the speed deriving unit in the embodiment.
Figure 4C:
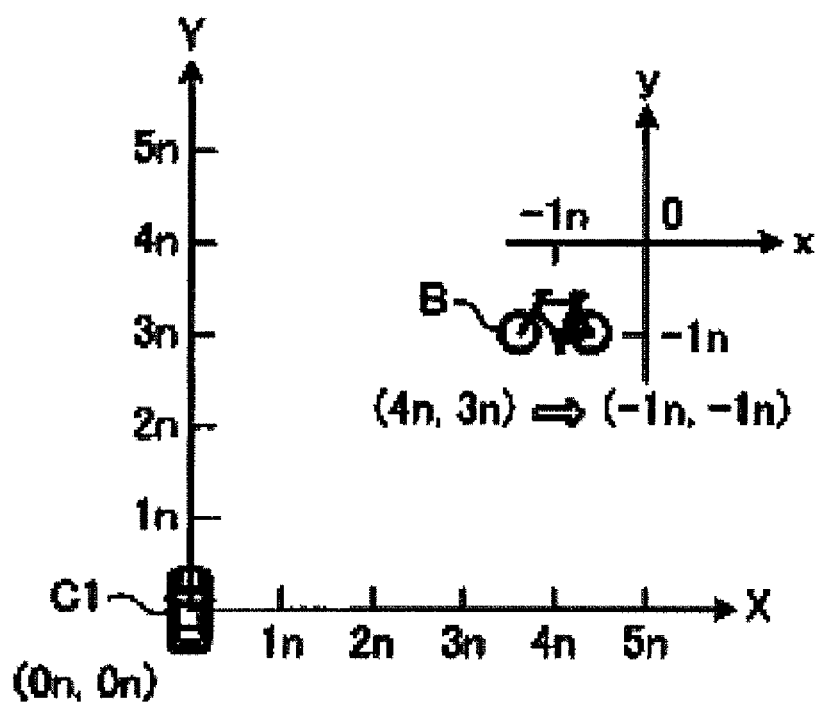
FIG. 4C is an explanatory diagram of the speed deriving procedure by the speed deriving unit in the embodiment.

Here, the speed deriving procedure by the speed deriving unit 75a will be described with reference to FIG. 4A, FIG. 4B, and FIG. 4C. FIG. 4A, FIG. 4B, and FIG. 4C are explanatory diagrams of the speed deriving procedure by the speed deriving unit 75a in the embodiment.

In a case where the target information of the newly detected target is input from the pairing unit 73c, the speed deriving unit 75a can acquire the relative speed of the target with respect to the host vehicle C1 from the target information, but cannot derive the speed of the target of the newly detected target since there is no target history information 74c.

Therefore, the speed deriving unit 75a derives the speed of the target based on the speed of the host vehicle C1 acquired from the vehicle speed sensor 11 via the vehicle control device 10 and the relative speed of the target included in the target information.

For example, as illustrated in FIG. 4A, in a case where the speed of the host vehicle is Vx [km/h] and the relative speed of the newly detected oncoming vehicle C with respect to the host vehicle C1 is Vy [km/h], the speed deriving unit 75a derives Vy−Vx [km/h] obtained by subtracting the speed Vx of the host vehicle from the relative speed Vy as the speed of oncoming vehicle C.

In this way, the speed deriving unit 75a can derive a speed of the newly detected target. Then, the speed deriving unit 75a outputs the information indicating the derived speed of the target and the target information of the target to the region setting unit 75b.

In addition, in a case where the target information of the target consecutively detected equal to or more than two times is input from the pairing unit 73c, the speed deriving unit 75a derives the speed of the target based on the target information currently input and the target history information 74c of the target of which the target information is currently input.

Here, since the cycle in which the detection processing is performed is a constant cycle (for example, 50 ms), the speed deriving unit 75a can derive the movement amount of the target moved during the period from the previous processing to the current processing, and can derive the speed of the target by dividing the derived movement amount by the cycle of the detection processing.

However, the speed deriving unit 75a cannot derive the movement amount of the target moved during the period from the previous processing to the current processing even if the target information at the previous processing time and the current processing time is used as it is.

Specifically, since the angle of the target with respect to the host vehicle C1 and the distance from the host vehicle C1 to the target is included in the target information, the speed deriving unit 75a can derive the relative movement amount of the target with respect to the host vehicle C1, but cannot derive the movement amount of the target.

For example, by converting the position of the target with respect to the host vehicle C1 in the geodetic coordinate system to that in the earth's center coordinate system, it is possible to calculate the absolute position of the target during the previous processing and the current processing, and calculate the movement amount of the target. However, in such conversion processing, there are many coordinate conversion paths, which increases the processing load.

Therefore, for the target consecutively detected equal to or more than two times in the current processing, the speed deriving unit 75a derives the absolute movement amount of the target by subtracting the absolute movement amount of the host vehicle C1 from the relative movement amount of the target with respect to the host vehicle C1 during the period of one cycle of the detection processing.

For example, as illustrated in FIG. 4B, in a case where the position of the host vehicle C1 is set as an origin (0n, 0n) in the previous processing, the bicycle B is assumed to be newly detected at the coordinates (5n, 5n). N is an integer.

At this time, it is assumed that the host vehicle C1 moves to the positive direction of the Y axis at a speed of advancing 1n during the period of one cycle of the detection processing, and the bicycle B moves toward the host vehicle C1 from the angle of right oblique 45° at a speed of advancing 1n√2 during the period of one cycle of detection processing.

In this case, when the position of the host vehicle C1 in the current processing is set to the origin (0n, 0n), the coordinates of the relative position of bicycle B with respect to the host vehicle C1 is (4n, 3n) as illustrated in FIG. 4C. As described above, the relative position of the bicycle B with respect to the host vehicle C1 changes as much as 2n in the −Y direction and 1n in the −X direction during the period from the previous processing to the current processing. However, the movement amount of the bicycle B includes the movement amount of the host vehicle C1, and is not the absolute movement amount of the bicycle B.

Therefore, as illustrated in FIG. 4B, the speed deriving unit 75a converts the coordinates (5n, 5n) indicating the relative position of the bicycle B newly detected in the previous processing with respect to the host vehicle C1 into the coordinates (0n, 0n) in the absolute coordinate system in which the position of the bicycle B is the origin.

The speed deriving unit 75a subtracts the movement amount of the host vehicle C1 during the period of one cycle in the detection processing from the coordinates (4n, 3n) indicating the relative position of bicycle B with respect to the host vehicle C1 in the current processing.

In this way, as illustrated in FIG. 4C, the speed deriving unit 75a can convert the coordinates (4n, 3n) indicating the relative position of the bicycle B with respect to the host vehicle C1 in the current processing into the coordinates (−1n, −1n) in the absolute coordinate system in which the position of the bicycle B in the previous processing is the origin.

As described above, the speed deriving unit 75a can derive the absolute position of the bicycle B by performing the simple processing of subtracting the movement amount of the host vehicle C1 during the period of one cycle of the detection processing from the coordinates indicating the relative position of the bicycle B with respect to the host vehicle C1 in the current processing. Subsequently, the speed deriving unit 75a derives the speed of bicycle B by dividing the distance from the absolute position of bicycle B at the time of the previous processing to the absolute position of the bicycle B at the time of the current processing by the cycle of detection processing.

In addition, in a case where the target consecutively detected equal to or more than two times in the current processing is detected again in the next processing, the speed deriving unit 75a derives the speed of the target in the next processing with the relative position with respect to the host vehicle C1 which is the target detected in the current processing as the new reference position (origin) of the target. The speed deriving unit 75a outputs the information indicating the derived speed of the target and the target information of the target to the region setting unit 75b.

Returning to FIG. 3, the region setting unit 75b is a processing unit that changes and sets the shape of the prediction region where the target having the temporal continuity with and same as the target detected in the current processing is detected again in the next processing according to the information indicating the speed of the target input from the speed deriving unit 75a.

The region setting unit 75b performs setting of the prediction region by outputting the information indicating the prediction region having a shape corresponding to the speed of the target to the determination unit 75c. The region setting unit 75b also performs processing for outputting the target information input from the speed deriving unit 75a to the determination unit 75c. A specific example of the prediction region set by the region setting unit 75b will be described later with reference to FIGS. 5A to 6C.

The determination unit 75c is a processing unit that performs continuity determination processing for determining whether or not the target detected in the current processing is the target having the temporal continuity with and same as the target detected in the previous processing. In a case where the target information of the target newly detected in the current processing is input, the determination unit 75c outputs the target information to the filtering processing unit 73e.

In addition, in a case where the target information relating to a plurality of targets consecutively detected equal to or more than two times in the current processing is input, the determination unit 75c temporarily registers all the target information in the tracking candidate list 74b. Subsequently, the determination unit 75c determines whether or not all the targets of which the target information is registered in the tracking candidate list 74b exist in the prediction region set in the previous processing.

In a case where it is determined that the registered target is not the target existing in the prediction region, the determination unit 75c deletes the target information of the target from the tracking candidate list 74b. In a case where it is determined that the registered target is the target existing in the prediction region, the determination unit 75c determines whether or not the type of the target is same as the type of the target detected in the previous processing based on the identification information 74a.

In a case where it is determined that the type is not same as the type of the target detected in the previous processing, the determination unit 75c deletes the target information of the target from the tracking candidate list 74b. Then, the determination unit 75c finally determines that the target of which the target information remains in the tracking candidate list 74b is the target having the temporal continuity and the same as the target detected in the previous processing.

The determination unit 75c performs this series of continuity determination processing for all the targets detected in the previous processing. Then, the determination unit 75c outputs the target information of the target determined to be the target having the temporal continuity with as the same as the target detected in the previous processing to the filtering processing unit 73e.

Next, a specific example of a procedure for the region setting unit 75b to set the prediction region and a procedure for the determination unit 75c to perform the continuity determination processing will be described with reference to FIG. 5A to FIG. 6C. FIG. 5A to FIG. 6C are explanatory diagrams of the prediction region setting procedure and the continuity determining procedure in the embodiment.

Figure 5A:
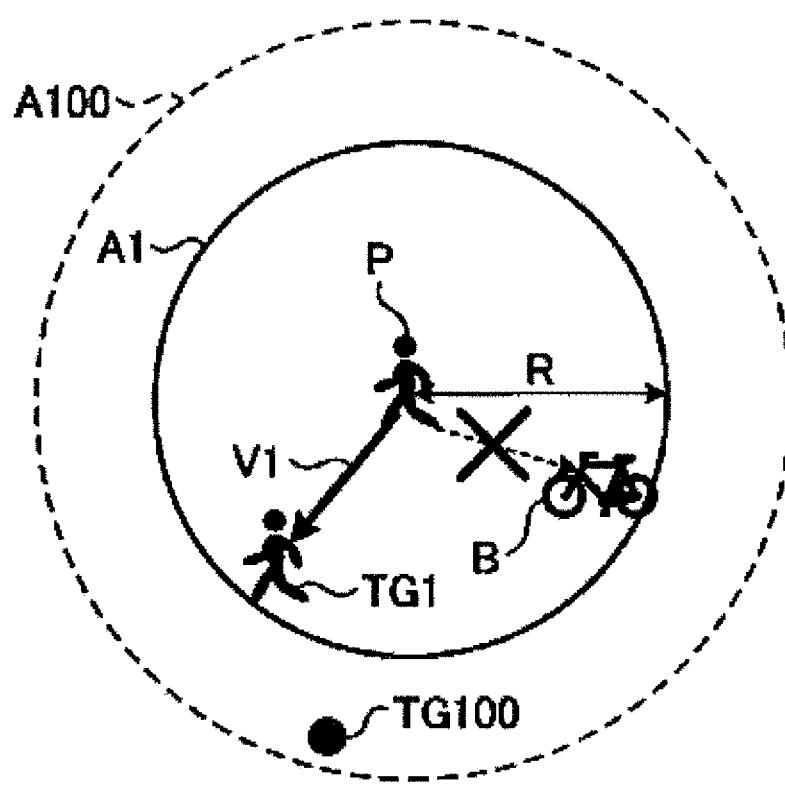
FIG. 5A is an explanatory diagram of a prediction region setting procedure and a continuity determining procedure in the embodiment.

As illustrated in FIG. 5A, in a case where a target newly detected in the current processing is the pedestrian P which is a low-speed moving target, the region setting unit 75b sets a circular prediction region A1 having a center at the position of the pedestrian P for the next processing. At this time, the region setting unit 75b sets the circular prediction region A1 of which the radius R is a distance that the pedestrian P can move from the center on foot or on half-running.

In the next processing, the determination unit 75c searches a plurality of targets of which the target information is registered in the tracking candidate list 74b for the targets existing in the prediction region A1. For example, in a case where a pedestrian TG1 and a bicycle B exist in the prediction region A1, the determination unit 75c determines that the pedestrian TG1 having a type same as that of the pedestrian P detected in the previous processing is the target same as the pedestrian P detected in the previous processing.

In this way, the determination unit 75c can prevent a target TG100 existing at the position not to reach on foot or on half-running from the position where the pedestrian P is newly detected until the next processing is performed, that is, the position outside the prediction region A1, from being erroneously determined as the pedestrian P.

In addition, even in a case where a plurality of targets are detected in the prediction region A2, in the next processing, the determination unit 75c can detect the target same as the target detected in the current processing. Therefore, the radar apparatus 1 can reduce the target tracking failure probability in a case where the low-speed moving target is detected.

Figure 5B:
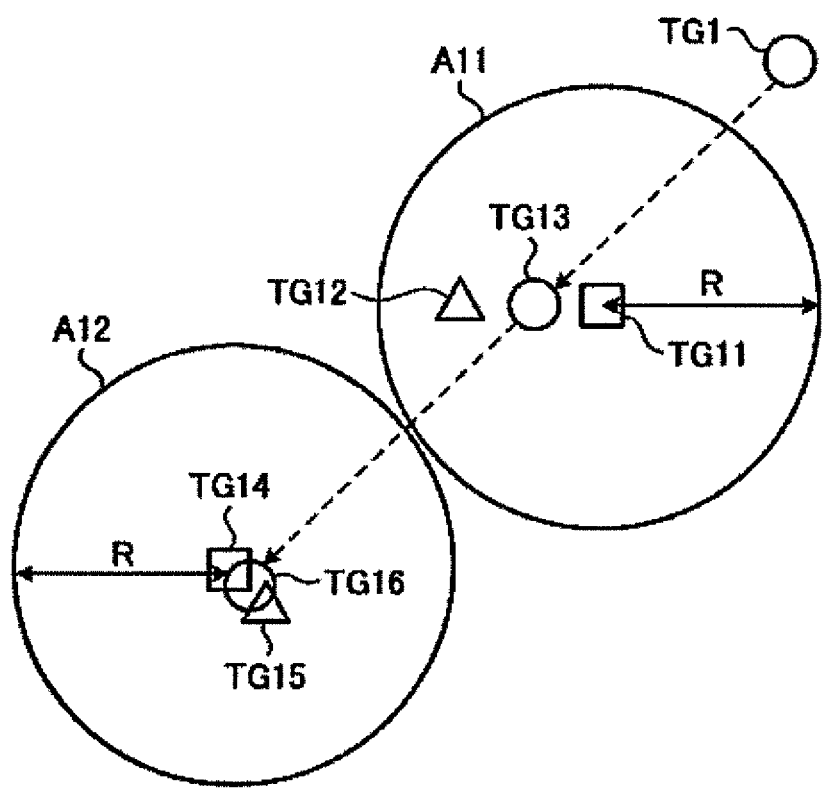
FIG. 5B is an explanatory diagram of a prediction region setting procedure and a continuity determining procedure in the embodiment.

In addition, as illustrated in FIG. 5B, in a case where the pedestrian TG1 is detected in the next processing, the region setting unit 75b sets a circular prediction region A11 having a radius R having a center at the predicted position TG11 where the pedestrian TG1 is detected in the next iteration of the detection processing.

The determination unit 75c searches for the pedestrian TG12 existing in the prediction region A11 in the next iteration of the detection processing (second detection processing) subsequent to the detection processing (first detection processing) in which the pedestrian TG1 is detected, and then, sets the position of the position TG13 obtained by smoothing the position of the pedestrian TG12 and the position of the predicted position TG11 as the third detection position of the pedestrian P.

That is, the determination unit 75c smoothes the target information of the pedestrian TG12 registered in the tracking candidate list 74b and the target information of the predicted position TG11, and sets the result as the target information indicating the position TG13 after the smoothing processing. Then, the determination unit 75c outputs the target information indicating the position TG13 after the smoothing processing to the filtering processing unit 73e.

Thereafter, the region setting unit 75b sets a circular prediction region A12 having a radius R having a center at the predicted position TG14 where the pedestrian TG1 is detected in the next iteration of the detection processing. The determination unit 75c searches for the pedestrian TG15 existing in the prediction region A12, and sets the position of the position TG16 obtained by smoothing the position of the pedestrian TG15 and the position of the predicted position TG14 as the fourth detection position of pedestrian P. Thereafter, the region setting unit 75b and the determination unit 75c continue to detect and track the newly detected pedestrian P (see FIG. 5A) by repeating the above-described processing.

As described above, in a case where the detected target is the pedestrian P, the region setting unit 75b sets a circular prediction region A1 having a center at the detection position. Even if the pedestrian P makes an unpredictable movement such as suddenly changing the direction of movement, the radar apparatus 1 can detect the pedestrian P in the next processing in the prediction regions A1, A11, and A12.

Figure 6A:
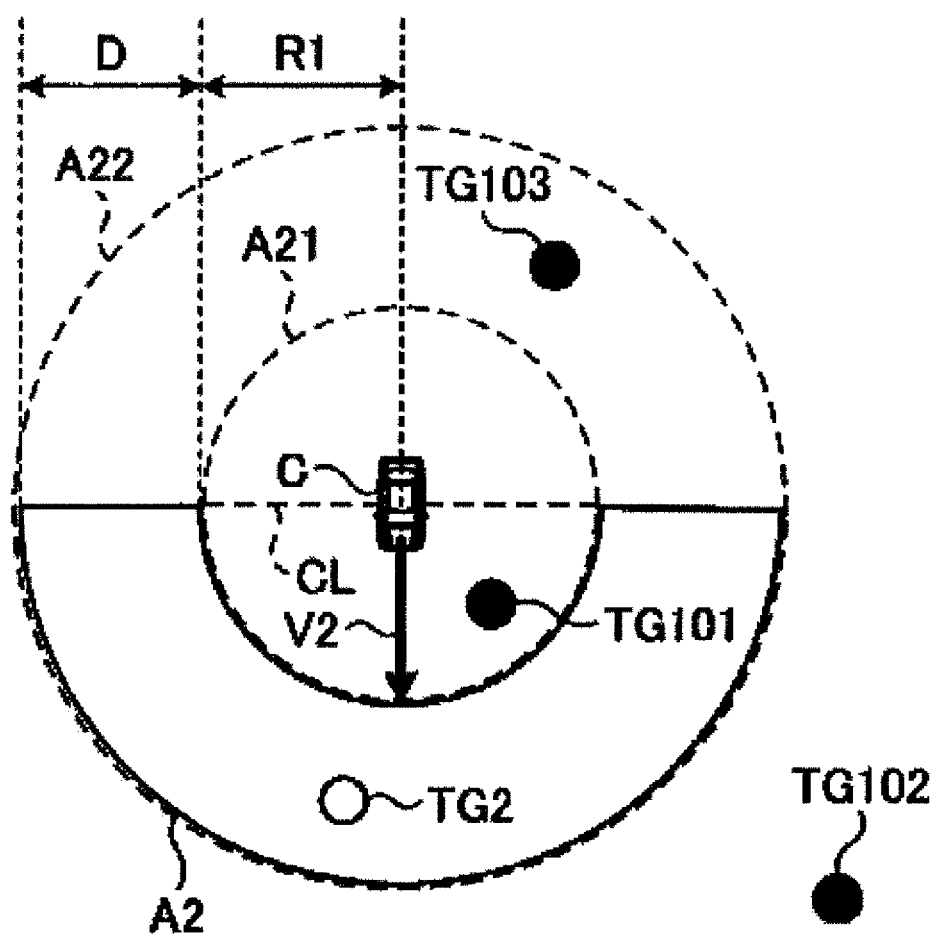
FIG. 6A is an explanatory diagram of a prediction region setting procedure and a continuity determining procedure in the embodiment.

In addition, as illustrated in FIG. 6A, in a case where a target newly detected in the current processing is an oncoming vehicle C which is a high-speed moving target, the region setting unit 75b sets a prediction region A2 outside the circular region A21 having a radius R1 having a center at the position where the oncoming vehicle C is detected.

At this time, the region setting unit 75b calculates the radius R1 of the circular region A21 based on a calculation formula; the speed of the oncoming vehicle C×the cycle of the detection processing×the weight coefficient W. The weight coefficient W may be set as a fixed value or a variable value.

As described above, the region setting unit 75b sets a prediction region A2 outside the circular region A21. In this way, the radar apparatus 1 can prevent the target TG101 existing at the position where the target may not be detected in the next processing if the target is a high-speed moving target since the position is too close from the position where the oncoming vehicle C is newly detected, from being erroneously determined as the oncoming vehicle C.

In addition, in a case of setting the prediction region A2 outside the circular region A21, the region setting unit 75b sets a prediction region A2 in a donut-shaped region A22 having a width D in a region annularly surrounding the circular region A21. In this way, the radar apparatus 1 can prevent the target TG102 existing at the position where the target may not be detected in the next processing even if the target is a high-speed moving target since the position is too far from the position where the oncoming vehicle C is newly detected, from being erroneously determined as the oncoming vehicle C.

In addition, in a case of setting the prediction region A2 in the donut-shaped region, the region setting unit 75b sets a half donut-shaped prediction region A2 positioned at the speed V2 direction side of the oncoming vehicle C (traveling direction of oncoming vehicle C) among the donut-shaped region A22.

A boundary position between the half donut-shaped region positioned at the direction side reverse to the speed V2 direction of the oncoming vehicle C (a direction reverse to the traveling direction of the oncoming vehicle C) and the half donut-shaped region positioned at the speed V2 direction side of the oncoming vehicle C described above among the donut-shaped region A22, extends toward the vehicle width direction of the oncoming vehicle C, and becomes a position overlapping the vehicle width line CL passing through a substantially center position of a vehicle body of the oncoming vehicle C. The substantially center position of the vehicle body of the oncoming vehicle C is a position at which the position of substantially middle of the length of the vehicle body in the traveling direction of the oncoming vehicle C and the position of substantially middle of the length of the vehicle body in the vehicle width direction of the oncoming vehicle C overlap.

In this way, the radar apparatus 1 can prevent the target TG 103 existing in the rear area of the oncoming vehicle C which may not be detected in the next processing unless an impossible situation occurs such as oncoming vehicle C suddenly retreats, from being erroneously determined as the oncoming vehicle C.

The determination unit 75c determines that the oncoming vehicle TG2 detected in the next processing in the half donut-shaped prediction region A2 set in the current processing is the target having the temporal continuity with and same as the oncoming vehicle C detected in the current processing. In this way, the determination unit 75c can reduce the target tracking failure probability even when a high-speed moving target is detected.

Figure 6B:
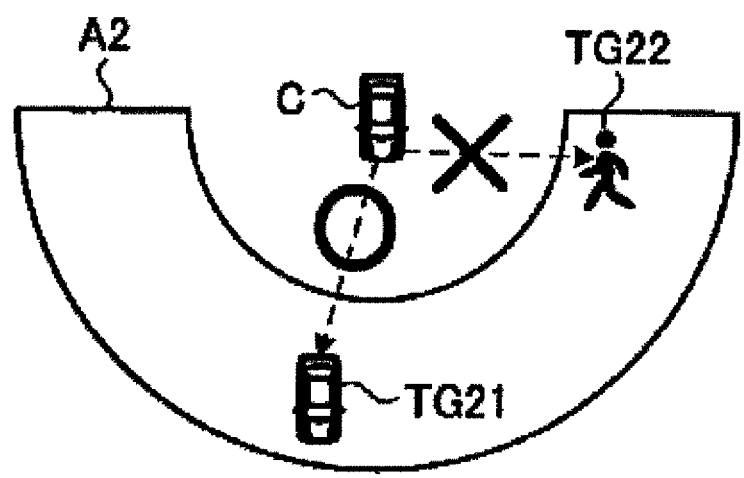
FIG. 6B is an explanatory diagram of a prediction region setting procedure and a continuity determining procedure in the embodiment.

As illustrated in FIG. 6B, in a case where an oncoming vehicle TG21 and a pedestrian TG22 are detected in the half donut-shaped prediction region A2. The region setting unit 75b determines that the oncoming vehicle TG21 having the type same as that of the oncoming vehicle C is the target same as the oncoming vehicle C detected in the current processing based on the identification information 74a. Therefore, according to the radar apparatus 1, it is possible to reduce the target tracking failure probability even when a plurality of targets are detected in the prediction region A2.

Figure 6C:
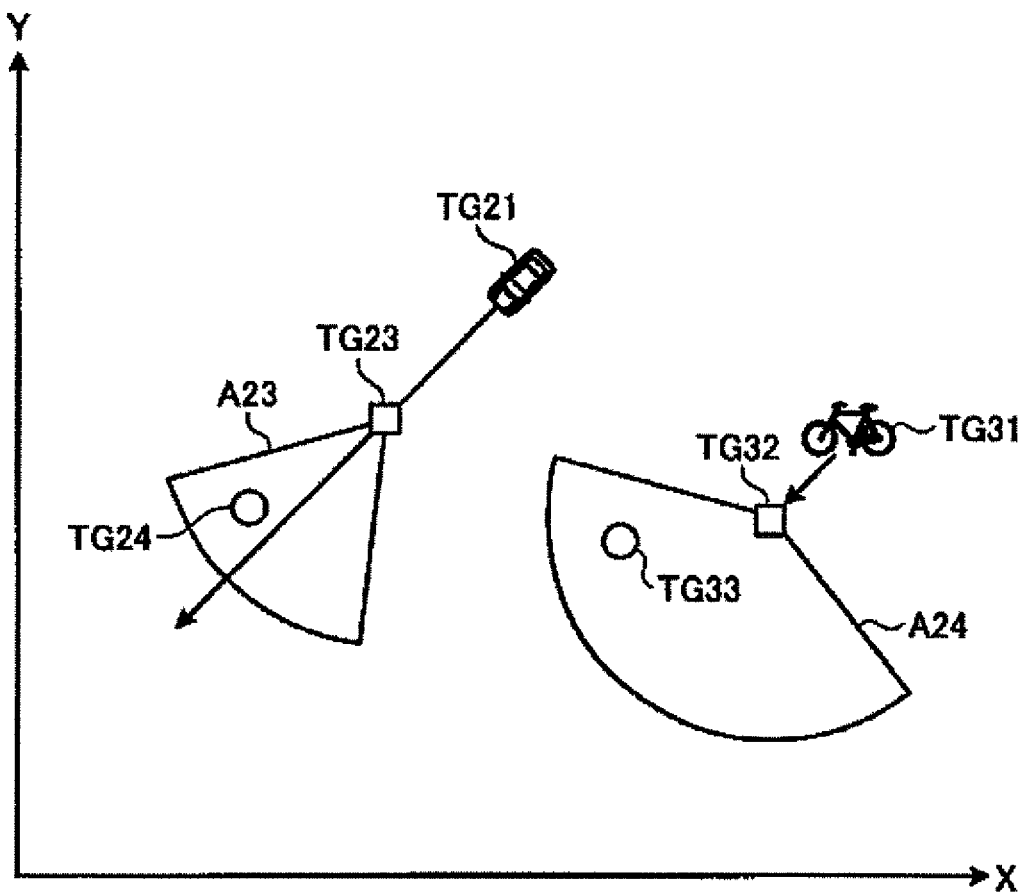
FIG. 6C is an explanatory diagram of a prediction region setting procedure and a continuity determining procedure in the embodiment.

In addition, as illustrated in FIG. 6C, in a case where an oncoming vehicle TG21 is detected in the next processing, the predicted position TG23 where the target same as the oncoming vehicle TG21 is detected next time is a pivot of a fan, the region setting unit 75b sets a fan-shaped prediction region A23 that spreads around the speed direction of the oncoming vehicle TG21. Then, the determination unit 75c determines the oncoming vehicle TG24 detected in the prediction region A23 in the next processing is the target having the temporal continuity with and same as the oncoming vehicle TG21 detected in the current processing.

As described above, the region setting unit 75b sets a fan-shaped prediction region A23 of which a range is further narrower than the half donut-shaped prediction region A2 for the high-speed moving target consecutively detected equal to or more than two times.

In this way, the determination unit 75c reduces the probability of erroneously determining that another target which is not same as the oncoming vehicle TG21 detected in the current processing is the same target. Therefore, the radar apparatus 1 can reduce the target tracking failure probability.

In addition, the region setting unit 75b can also determine whether the target having a speed higher than that of the low-speed moving target is a high-speed moving target or a middle-speed moving target based on the speed of the target. Here, the high-speed moving target is, for example, the oncoming vehicle C, and the middle-speed moving target is, for example, a bicycle or the like which is traveling.

As illustrated in FIG. 6C, in a case where the detected target is a bicycle TG31 which is a middle-speed moving target, the next predicted position TG32 of the bicycle TG31 is a pivot of a fan, the region setting unit 75b sets a fan-shaped prediction region A24 of which a spread angle is larger than that in the case of the oncoming vehicle TG21. Then, the determination unit 75c determines that the bicycle TG33 detected in the prediction region A24 in the next processing is the target having the temporal continuity with and same as the bicycle TG31 detected in the current processing.

As described above, the region setting unit 75b sets a prediction region in which the spread angle of the fan shape spreading with the speed direction as a center is increased as the speed of the target detected in the current processing becomes low, and in which the spread angle of the fan shape spreading the speed direction as a center is decreased as the speed of the target detected in the current processing becomes high.

In this way, the radar apparatus 1 can reduce the target tracking failure probability for the high-speed moving target such as the oncoming vehicle TG21 of which the variation in the traveling direction is smaller than that of the middle-speed moving target such as the bicycle TG31 by making the range of the prediction region A23 relatively narrow.

In addition, the radar apparatus 1 can reduce the target tracking failure probability for the middle-speed moving target such as the bicycle TG31 of which the variation in the traveling direction is larger than that of the high-speed moving target such as the oncoming vehicle TG21 by making the range of the prediction region A23 relatively wide.

Here, the target having a higher speed than the low-speed moving target is classified into two types, the high-speed moving target and the middle-speed moving target. However, the region setting unit 75b may be configured to adjust the spread angle of the fan-shaped prediction region according to the speed of the target.

Figure 7:
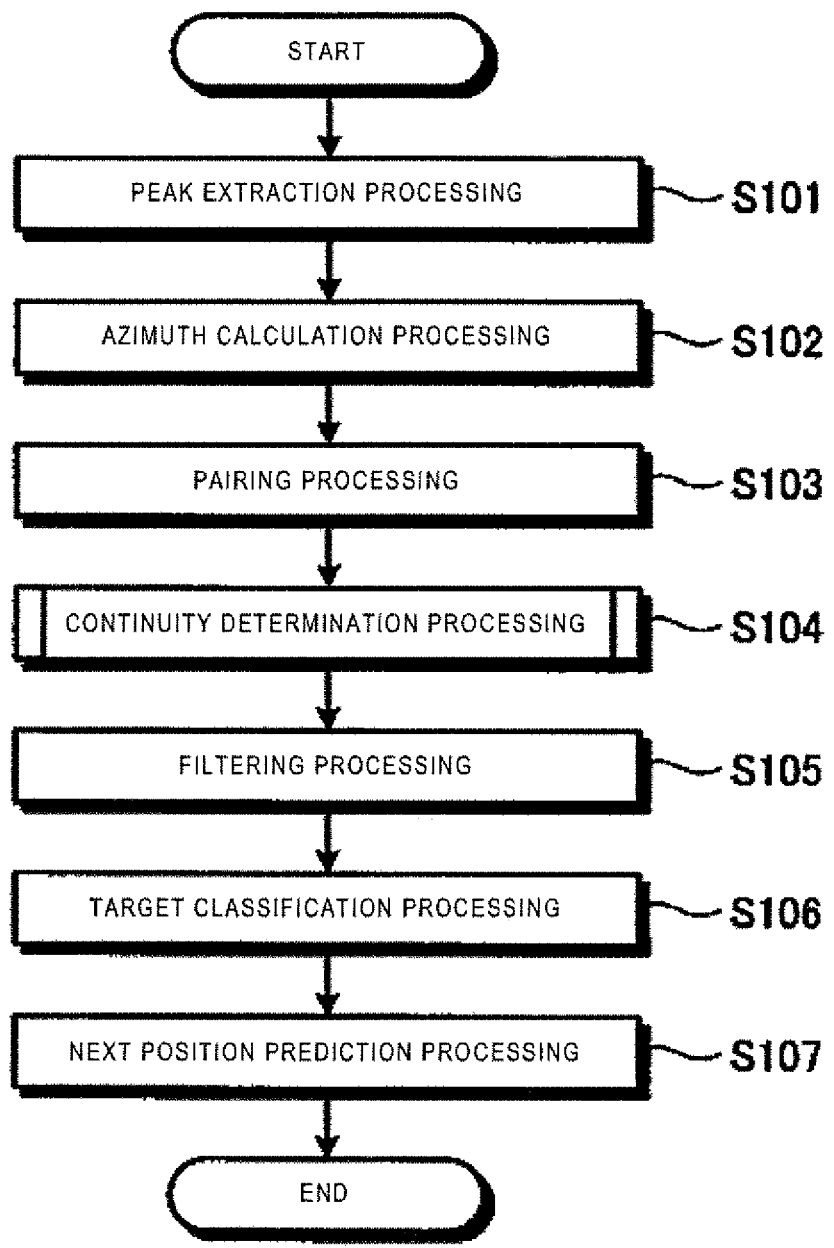
FIG. 7 is a flowchart illustrating main processing performed by a data processing unit of the radar apparatus in the embodiment.
Figure 8:
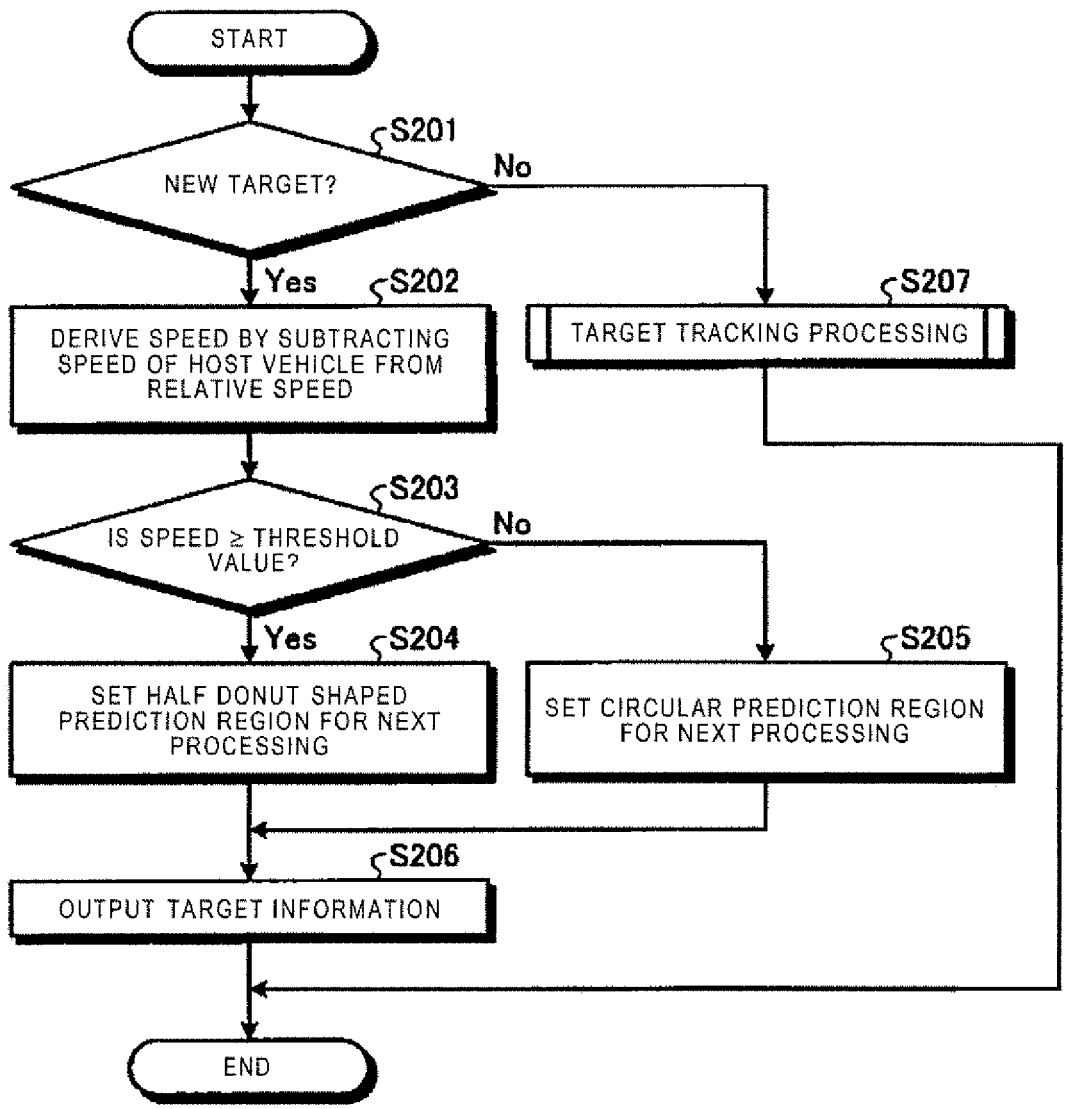
FIG. 8 is a flowchart illustrating continuity determination processing during the main processing in the embodiment.
Figure 9:
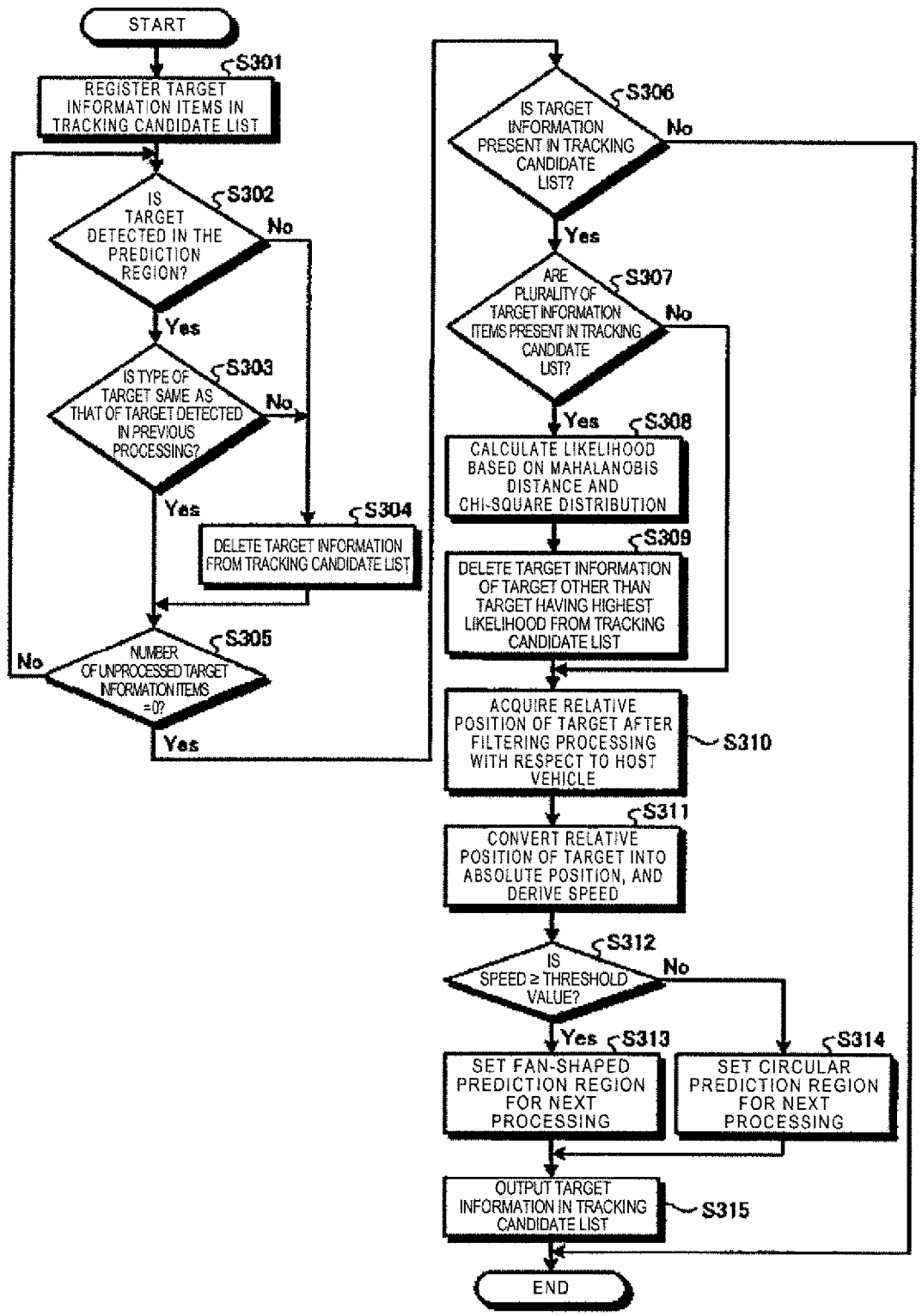
FIG. 9 is a flowchart illustrating target tracking processing during the continuity determination processing in the embodiment.

Next, a processing procedure performed by the data processing unit 73 of the radar apparatus 1 according to the embodiment will be described with reference to FIG. 7 to FIG. 9. FIG. 7 is a flowchart illustrating main processing performed by the data processing unit 73 of the radar apparatus 1 in the embodiment. FIG. 8 is a flowchart illustrating continuity determination processing during the main processing in the embodiment. FIG. 9 is a flowchart illustrating target tracking processing during the continuity determination processing in the embodiment.

The data processing unit 73 repeatedly performs the main processing illustrated in FIG. 7 in every predetermined time (for example, 50 ms) when the power is ON. Specifically, in the data processing unit 73, as illustrated in FIG. 7, firstly, the peak extraction unit 73a performs peak extraction processing based on the beat signal input from the FFT unit 72 after the fast Fourier transform processing (STEP S101). Subsequently, the azimuth calculation unit 73b performs azimuth calculation processing based on the processing result of the peak extraction processing (STEP S102).

Thereafter, the pairing unit 73c performs pairing processing based on the processing result of the azimuth calculation processing (STEP S103). Subsequently, the continuity determination unit 73d performs continuity determination processing based on the processing result of the pairing processing (STEP S104). Details of the continuity determination processing will be described later with reference to FIG. 8. Thereafter, the filtering processing unit 73e performs filtering processing based on the processing result of the continuity determination processing (STEP S105).

Subsequently, the target classifying unit 73f performs target classification processing based on the processing result of the filtering processing (STEP S106), and outputs the target information of the target after the target classification processing to the external device. Thereafter, the next position prediction unit 73g performs next position prediction processing for the target based on the processing result of the target classification processing (STEP S107), and ends the processing.

Next, the continuity determination processing will be described with reference to FIG. 8. As illustrated in FIG. 8, when starting the continuity determination processing, the continuity determination unit 73d firstly determines whether or not the target detected in the current processing is a newly detected new target (STEP S201).

In a case where it is determined that the target is not a new target (No in STEP S201), the continuity determination unit 73d performs target tracking processing (STEP S207) and ends the processing. Details of the target tracking processing will be described later with reference to FIG. 9.

In addition, in a case where it is determined that the target detected in the current processing is a new target (Yes in STEP S201), the continuity determination unit 73d derives the speed of the target by subtracting the speed of the host vehicle from the relative speed of the target (STEP S202).

Subsequently, the continuity determination unit 73d determines whether or not the derived speed is equal to or higher than a threshold value (STEP S203). In a case where it is determined that the speed is equal to or higher than the threshold value (Yes in STEP S203), the continuity determination unit 73d sets a half donut-shaped prediction region for the next processing (STEP S204), and shifts the processing to STEP S206.

In addition, in a case where it is determined that the speed is not equal to or higher than the threshold value (No in STEP S203), the continuity determination unit 73d sets a circular prediction region for the next processing (STEP S205), and shifts the processing to STEP S206. In STEP S206, the continuity determination unit 73d outputs the target information of the new target to the filtering processing unit 73e, and ends the processing.

Next, the target tracking processing will be described with reference to FIG. 9. As illustrated in FIG. 9, when starting the target tracking processing, firstly, the continuity determination unit 73d registers all of the plurality of target information items detected in the current processing in the tracking candidate list 74b in addition to the new target (STEP S301).

Subsequently, the continuity determination unit 73d determines whether or not the target of which the target information is registered in the tracking candidate list 74b is a target detected in the prediction region (STEP S302). In a case where it is determined that the target is not the target detected in the prediction region (No in STEP S302), the continuity determination unit 73d shifts the processing to STEP S304.

In addition, in a case where it is determined that the target is the target detected in the prediction region (Yes in STEP S302), the continuity determination unit 73d determines whether or not a type of the target is the same as that of the target detected in the previous processing (STEP S303). In a case where it is determined that the type of the target is not the same (No in STEP S303), the continuity determination unit 73d shifts the processing to S304.

In STEP S304, the continuity determination unit 73d deletes the target information of the target that is not the target detected in the prediction region and the target of which the type is not same as that of the target detected in the previous processing from the tracking candidate list 74b, and then, shifts the processing to STEP S305.

In addition, in a case where it is determined that the type of the target is the same as that of the target detected in the previous processing (Yes in STEP S303), the continuity determination unit 73d determines whether or not the number of unprocessed target information items in the tracking candidate list 74b is zero (STEP S305). In a case where it is determined that the number of unprocessed target information items is not zero (No in S305), the continuity determination unit 73d shifts the processing to S302.

In addition, in a case where it is determined that the number of unprocessed target information items is zero (Yes in S305), the continuity determination unit 73d determines whether or not the target information is present in the tracking candidate list 74b (STEP S306). In a case where it is determined that the target information is not present (No in STEP S306), the continuity determination unit 73d ends the processing.

In addition, in a case where it is determined that the target information is present in the tracking candidate list 74b (Yes in STEP S306), the continuity determination unit 73d determines whether or not a plurality of target information items are present in the tracking candidate list 74b (STEP S307).

In a case where it is determined that a plurality of target information items are not present in the tracking candidate list 74b (No in STEP S307), the continuity determination unit 73d shifts the processing to S310. In addition, in a case where it is determined that a plurality of target information items are present in the tracking candidate list 74b (Yes in STEP S307), the continuity determination unit 73d shifts the processing to S308.

In S308, the continuity determination unit 73d calculates a likelihood indicating a certainty that the target is the target same as the target detected in the previous processing based on a Mahalanobis distance and a chi-square distribution for each of the plurality of target information items in the tracking candidate list 74b.

Subsequently, the continuity determination unit 73d deletes the target information of the target other than the target having the highest likelihood from the tracking candidate list 74b (STEP S309), and acquires the relative position of the target after filtering processing with respect to the host vehicle C1 (STEP S310).

Thereafter, the continuity determination unit 73d converts the relative position of the target into the absolute position, and derives the speed of the target based on the absolute position of the target at the previous processing and the absolute position of the target at the current processing (STEP S311). Subsequently, the continuity determination unit 73d determines whether or not the speed derived in STEP S311 is equal to or higher than the threshold value (STEP S312).

In a case where it is determined that the speed is equal to or higher than the threshold value (Yes in STEP S312), the continuity determination unit 73d sets a fan-shaped prediction region for the next processing (STEP S313), and shifts the processing to STEP S315.

In a case where it is determined that the speed is not equal to or higher than the threshold value (No in STEP S312), the continuity determination unit 73d sets a circular prediction region for the next processing (STEP S314), and shifts the processing to STEP S315. In STEP S315, the continuity determination unit 73d outputs the target information remaining in the tracking candidate list 74b to the filtering processing unit 73e, and ends the processing.

As described above, the radar apparatus according to the embodiment includes the detection unit, the speed deriving unit, the region setting unit, and the determination unit. The detection unit performs the detection processing for detecting the target iteratively at a predetermined cycle. The speed deriving unit derives the speed of the target detected in the current iteration of the detection processing.

The region setting unit sets the prediction region where the target having the temporal continuity with and same as the target detected in the current iteration of the detection processing is detected in the next iteration of the detection processing, while changing the shape of the prediction region according to the speed derived by the speed deriving unit.

The determination unit determines that the target detected in the current iteration of the detection processing in the prediction region set by the region setting unit is the target having the temporal continuity with and same as the target detected in the previous detection processing.

In this way, in a case where the target detected in the current processing is detected in the next processing, the radar apparatus can reduce the target tracking failure probability by detecting the target from the prediction region appropriately changing the shape according to the speed of the target.

In the radar apparatus in the embodiment described above, the radius of the circular prediction region set when detecting the low-speed moving target is fixed. However, the radius of the prediction region can be increased as the speed of the target becomes high and the radius of the prediction region can be decreased as the speed of the target becomes low. In this way, the radar apparatus can detect the target in the next processing same as the target detected in the current processing with high accuracy.

In addition, in the radar apparatus in the embodiment described above, in a case of setting the prediction region in an area annularly surrounding a predetermined region having a center at the target detection position, the spread angle of the prediction region having a center at the speed direction of the target may be smaller as the speed of the target increases and may be larger as the speed of the target decreases.

In addition, in the embodiment described above, in a case where the radar apparatus sets a fan-shaped prediction region, the distance from the position of the pivot of the fan to the edge of the arc shape is fixed. However, the distance from the position of the pivot of the fan to the edge of the arc shape may be increased as the speed of the target becomes high and be decreased as the speed of the target becomes low.

As described above, the radar apparatus can improve the accuracy of detecting the target in the next processing same as the target detected in the current processing by achieving the diversity of the shape of the prediction region according to the speed of the target, and as a result thereof, the target tracking failure probability can be further reduced.

In addition, in the embodiment described above, a case where the radar apparatus is mounted on a vehicle is described as an example. However, the radar apparatus in the embodiment may be mounted on another movable body such as an aircraft or a ship. Furthermore, the radar apparatus in the embodiment can also be applied to, for example, infrastructure radar installed on the street.

Further effects and modification examples can be easily derived by those skilled in the art. Therefore, the wide-ranged aspects of the invention are not limited to the specific details and representative embodiment illustrated and described above. Accordingly, various modifications can be made without departing from the spirit or scope of the general concept of the invention as defined in the appended claims and their equivalents.

What is claimed is:

1. A radar apparatus comprising:
a processor programmed to:
perform a detection processing of detecting a target iteratively at a predetermined cycle;
derive a speed of the target detected in a current iteration of the detection processing;
set a prediction region where a target having temporal continuity with and being identical to the target detected in the current iteration of the detection processing is expected to be detected in a next iteration of the detection processing, while changing at least one of a size and a shape of the prediction region according to the derived speed, such that:
in a case where a new target is detected in the current detection processing and a speed of the new target is lower than a threshold value, an inside of a predetermined region having a center at a detection position of the new target is set as the prediction region; and
in a case where the speed of the new target is equal to or higher than the threshold value, the prediction region is set at an outside of the predetermined region; and
determine whether the target detected in the next iteration of the detection processing in the set prediction region has the temporal continuity with and is identical to target detected in the current iteration of the detection processing.

2. The radar apparatus according to claim 1, wherein in a case of setting the prediction region at the outside of the predetermined region, the prediction region is set at a region annularly surrounding the predetermined region.

3. The radar apparatus according to claim 2, wherein in a case of setting the prediction region at the region annularly surrounding the predetermined region, the prediction region is set as a region positioned at a speed direction side of the new target from the detection position of the region annularly surrounding the predetermined region.

4. The radar apparatus according to claim 1, wherein for a newly detected target in the current iteration of the detection processing, a relative speed between a moving object on which the radar apparatus is mounted and the newly detected target is derived, and the speed of the newly detected target is derived by subtracting a moving speed of the moving object from the relative speed.

5. The radar apparatus according to claim 1, wherein for a target detected equal to or more than two times in consecutive iterations of the detection processing, the speed is derived based on an absolute movement amount of the target obtained by subtracting an absolute movement amount of the moving object on which the radar apparatus is mounted from a relative movement amount of the target with respect to the moving object in the period of one cycle during which the detection processing is performed.

6. The radar apparatus according to claim 1, wherein the processor is programmed to:
identify a type of the target detected in the detection processing;
associate the target with the type of the target; and
determine whether the target identified in the next iteration of the detection processing is associated with a type identical to the target detected in the current iteration of the detection processing among targets detected in the prediction region in the next iteration of the detection processing, is the target having the temporal continuity with and being identical to the target detected in the current iteration of the detection processing.

7. A radar apparatus comprising:
a processor programmed to:
   perform a detection processing of detecting a target iteratively at a predetermined cycle;
   derive a speed of the target detected in a current iteration of the detection processing;
   predict a predicted position where a target detected equal to or more than two times in consecutive iterations of the detection processing is expected to be detected in the next iteration of the detection processing;
   set a prediction region where a target having temporal continuity with and being identical to the target detected in the current iteration of the detection processing is expected to be detected in a next iteration of the detection processing, while changing at least one of a size and a shape of the prediction region according to the derived speed, such that:
      in a case where a speed of the target of which the predicted position is predicted is lower than a threshold value, a circular region having a center at the predicted position is set as the prediction region; and
      in a case where the speed is equal to or higher than the threshold value, a fan-shaped prediction region spreading toward the speed direction of the target with the predicted position is set as the prediction region; and
   determine whether the target detected in the next iteration of the detection processing in the set prediction region has the temporal continuity with and is identical to target detected in the current iteration of the detection processing.

8. The radar apparatus according to claim 7, wherein in a case of setting the fan-shaped prediction region, a spread angle of the fan shape is decreased as the speed of the target detected in the current iteration of the detection processing increases.

9. The radar apparatus according to claim 7, wherein for a newly detected target in the current iteration of the detection processing, a relative speed between a moving object on which the radar apparatus is mounted and the newly detected target is derived, and the speed of the newly detected target is derived by subtracting a moving speed of the moving object from the relative speed.

10. The radar apparatus according to claim 7, wherein for the target detected equal to or more than two times in consecutive iterations of the detection processing, the speed is derived based on an absolute movement amount of the target obtained by subtracting an absolute movement amount of the moving object on which the radar apparatus is mounted from a relative movement amount of the target with respect to the moving object in the period of one cycle during which the detection processing is performed.

11. The radar apparatus according to claim 7, wherein the processor is programmed to:
   identify a type of the target detected in the detection processing;
   associate the target with the type of the target; and
   determine whether the target identified in the next iteration of the detection processing is associated with a type identical to the target detected in the current iteration of the detection processing among targets detected in the prediction region in the next iteration of the detection processing, is the target having the temporal continuity with and being identical to the target detected in the current iteration of the detection processing.

12. A target detection method executed by a signal processing device, the method comprising the steps of:
   (a) performing a detection processing of detecting a target iteratively at a predetermined cycle;
   (b) deriving a speed of the target detected in a current iteration of the detection processing;
   (c) setting a prediction region where a target having temporal continuity with and being identical the target detected in the current detection processing is expected to be detected in a next iteration of the detection processing, while changing at least one of a size and a shape of the prediction region according to the speed derived in step (b), such that:
      in a case where a new target is detected in the current detection processing and a speed of the new target is lower than a threshold value, an inside of a predetermined region having a center at a detection position of the new target is set as the prediction region; and
      in a case where the speed of the new target is equal to or higher than the threshold value, the prediction region is set at an outside of the predetermined region; and
   (d) determining whether the target detected in the next iteration of the detection processing in the prediction region set in step (c) has the temporal continuity with and is identical to the target detected in the current iteration of the detection processing.

* * * * *